US008672223B2

(12) United States Patent
Factor et al.

(10) Patent No.: US 8,672,223 B2
(45) Date of Patent: Mar. 18, 2014

(54) SYSTEM, DEVICE AND METHOD OF PROTECTING AIRCRAFTS AGAINST INCOMING MISSILES AND THREATS

(75) Inventors: Ronen Factor, Ramat Gan (IL); David Dragucki, Herzeliya (IL); Ariye Yehuda Caplan, Haifa (IL); Zahi Ben Ari, Haniel (IL); Semion Zelikman, Rishon Lezion (IL); Royee Li-Ran, Herzliya (IL)

(73) Assignee: BIRD Aerosystems Limited, Herzelia (IL)

( * ) Notice: Subject to any disclaimer, the term of this patent is extended or adjusted under 35 U.S.C. 154(b) by 0 days.

(21) Appl. No.: 13/432,029

(22) Filed: Mar. 28, 2012

(65) Prior Publication Data

US 2012/0298748 A1    Nov. 29, 2012

(30) Foreign Application Priority Data

May 24, 2011    (IL) .......................................... 213125

(51) Int. Cl.
*G06F 19/00* (2011.01)
(52) U.S. Cl.
USPC .......................................... 235/400; 342/53
(58) Field of Classification Search
USPC ............................ 235/400; 342/53, 54, 13, 14
See application file for complete search history.

(56) References Cited

U.S. PATENT DOCUMENTS

| | | | |
|---|---|---|---|
| 5,662,291 A | 9/1997 | Sepp et al. | |
| 6,707,052 B1 | 3/2004 | Wild et al. | |
| 6,771,205 B1 * | 8/2004 | Barton et al. | 342/13 |
| 2006/0065774 A1 * | 3/2006 | Roques et al. | 244/1 TD |
| 2007/0052806 A1 * | 3/2007 | Bnayahu et al. | 348/155 |
| 2007/0075182 A1 | 4/2007 | Fetterly | |
| 2007/0201015 A1 * | 8/2007 | Gidseg et al. | 356/29 |
| 2007/0255672 A1 * | 11/2007 | Olsson | 706/56 |
| 2009/0224958 A1 | 9/2009 | Aphek et al. | |
| 2010/0253567 A1 | 10/2010 | Factor et al. | |

OTHER PUBLICATIONS

European Search report for EP 12162267 dated Aug. 28, 2012.

* cited by examiner

*Primary Examiner* — Ahshik Kim
(74) *Attorney, Agent, or Firm* — Eitan, Mehulal & Sadot

(57) ABSTRACT

The present invention includes a system for protecting an aircraft against one or more incoming threats. The system includes one or more electro-optic sensors to scan an area around the aircraft for one or more possible incoming threats, and to generate an indication signal once an incoming threat is detected; an integrated unit combining a Missile Approach Confirmation Sensor (MACS) with Directed Infra-Red Counter Measure (DIRCM), to verify the incoming threat and to activate a countermeasure against the verified incoming threat; and a processor to receive data from said one or more electro-optic sensors and the integrated MACS-DIRCM unit, and to select a countermeasure technique for deployment against the incoming threat.

20 Claims, 4 Drawing Sheets

SYSTEM, DEVICE AND METHOD OF PROTECTING AIRCRAFTS AGAINST INCOMING MISSILES AND THREATS

PRIOR APPLICATION DATA

This application claims priority and benefit from Israeli application 213125, entitled "System, Device and Method of Protecting Aircrafts Against Incoming Missiles and Threats", filed on May 24, 2011.

FIELD

The present invention is related to the field of protecting aircrafts against incoming missiles or other incoming threats.

BACKGROUND

Military and civilian aircrafts, including fixed-wing aircrafts and rotary-wing aircrafts, may be exposed to threats from hostile entities, for example, terrorists or military forces. In the past three decades, numerous aircrafts have been damaged or destroyed by Infrared (IR) guided missiles, for example, short-range man-portable shoulder-fired IR guided missiles.

Some aircrafts may be equipped with a system for detecting an incoming threat and for activating a countermeasure towards the incoming threat. However, such a system may be expensive, heavy, volume-consuming, inaccurate and/or inefficient.

SUMMARY

The present invention may include, for example, devices, systems and methods for protecting aircrafts against incoming threats. For example, a self-protection system of an aircraft may perform verification of a pre-alarm and may activate an integrated high power Infra-Red (IR) laser to counter the incoming threat.

The present invention may include, for example, a system for protecting an aircraft against one or more incoming threats; the system may include: one or more electro-optic sensors to scan an area around the aircraft for one or more possible incoming threats, and to generate an indication signal once an incoming threat is detected; an integrated unit combining a Missile Approach Confirmation Sensor (MACS) with Directed Infra-Red Counter Measure (DIRCM), to verify the incoming threat and to activate a countermeasure against the verified incoming threat; and a processor to receive data from the one or more electro-optic sensors and the integrated MACS-DIRCM unit, and to select a countermeasure technique for deployment against the incoming threat.

In accordance with the present invention, the one or more electro-optic sensors may substantially continuously sense the area around the aircraft for incoming threats.

In accordance with the present invention, the MACS-DIRCM unit may include a plurality of MACS-DIRCM units having a plurality of non-identical fields-of-view, respectively.

In accordance with the present invention, the system may include a dual-axis steering gimbal to slew the MACS-DIRCM unit to a direction of the incoming threat.

In accordance with the present invention, the MACS-DIRCM unit may include one or more pulse Doppler radar units.

In accordance with the present invention, the MACS-DIRCM unit may include a high-power laser transmitter.

In accordance with the present invention, a verification functionality and a countermeasure functionality of the MACS-DIRCM unit may be mounted on a common gimbal.

In accordance with the present invention, the MACS-DIRCM unit may include a threat parameter generator to generate threat parameters during verification of a threat, and to provide the threat parameters to a countermeasure generator for construction of a countermeasure waveform for the incoming threat.

In accordance with the present invention, the MACS-DIRCM unit may include a threat parameter generator to generate threat parameters during verification of a threat, and to provide the threat parameters to a spectrum selector to select spectrum occupancy for a countermeasure unit.

In accordance with the present invention, the countermeasure generator may include means to update countermeasure parameters based on updated verification parameters.

In accordance with the present invention, the countermeasure generator may include a target locator to determine a target location during verification of the threat.

In accordance with the present invention, the high-power laser transmitter may be part of an antenna structure of the MACS-DIRCM unit.

In accordance with the present invention, the system may include a housing comprising a radome, and the radome may allow transmission of electromagnetic signals and optical signals.

In accordance with the present invention, the countermeasure generator may be activated during activation of a verification functionality of the MACS-DIRCM unit.

In accordance with the present invention, the countermeasure generator may be activated after completion of a verification functionality of the MACS-DIRCM unit.

In accordance with the present invention, the processor may include a data fusion unit to perform data fusion of data from the one or more electro-optic sensors and from the MACS-DIRCM unit.

In accordance with the present invention, one or more MACS-DIRCM units may be connected to one or more laser generators in parallel.

In accordance with the present invention, the MACS-DIRCM unit may be implemented as a single Line Replaceable Unit (LRU) able to perform both verification and countermeasure functions.

The present invention may provide other and/or additional benefits and/or advantageous.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
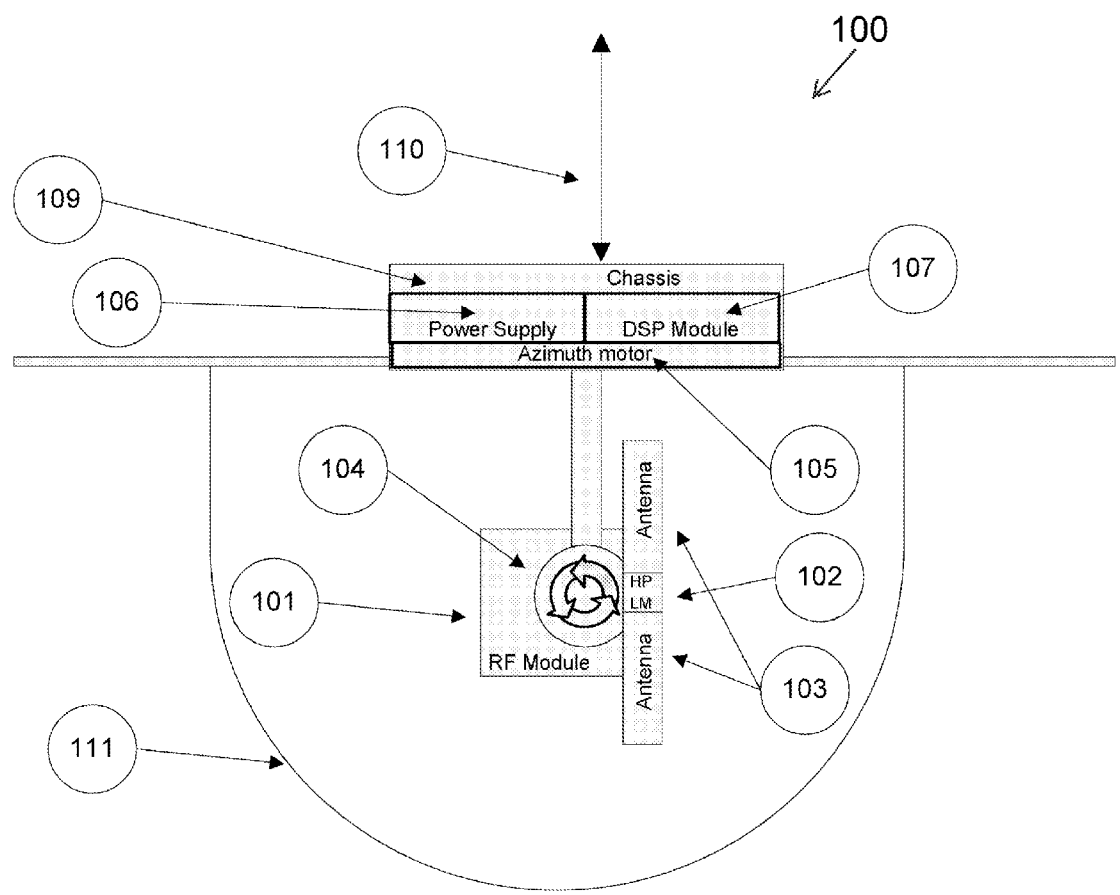
FIG. 1 is a schematic illustration of a MACS-DIRCM unit, in accordance with the present invention.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

The term "aircraft" as used herein may include, for example, an airborne platform or object or vehicle; a vehicle or object which is able to fly through the air or through an atmosphere of a planet; a vehicle or object which is able to sustain itself above the ground; an airplane; a helicopter; a manned aircraft; an unmanned aircraft; a Remotely Piloted Vehicle (RPV); an Unmanned Aerial Vehicle (UAV); a fixed-wing aircraft; a rotorcraft or rotary-wing aircraft; an autogyro or gyroplane; a powered aircraft; an unpowered aircraft (e.g., a glider, a paraglider, a balloon, a kite); an aircraft having one or more propellers; a jet propulsion aircraft; a military aircraft (e.g., a fighter, a bomber, a fighter-bomber, a ground-attack aircraft, an attack helicopter); a civilian aircraft (e.g., commercial, executive, cargo); a rocket; a missile; a rocket-powered aircraft; or the like.

The terms "protected aircraft" and/or "self-protected aircraft" as used herein may include, for example, an aircraft which is being protected or is intended to be protected against one or more incoming threats; or an aircraft on which a self-protective system is installed or mounted.

The terms "incoming threat", "airborne threat", and/or "threat", as used herein, may include, for example, a missile, a rocket, a bomb, a projectile, a self-propelled projectile, an airborne missile, an airborne object directed towards a protected aircraft, a missile having an engine and/or a warhead, a cruise missile, a guided missile, or a missile or rocket originating or launched from another aircraft or from another entity (e.g., from a person on the ground, from a vehicle, from a tank, from a ship, from a boat, from a submarine, or the like).

The present invention may include, for example, devices, systems, and methods for protecting aircrafts against incoming threats. The invention may provide, for example, a system which utilizes a combined or unified unit which includes two main functions, which may be a missile confirmation or verification sensor and a high powered IR laser module that is used to realize a directed IR counter measure function.

In accordance with the present invention, a system for protection of an aircraft against an incoming threat may include one or more electro-optic sensors to substantially continuously search for the incoming threat, and to generate a signal indicating that an incoming threat is detected or is suspected (e.g., possibly detected). The system may further include one or more missile confirmation/verification radar sensors, which may include one or more integral or integrated high power laser modules which may be automatically activated in response to the signal, after searching for and classifying the incoming threat. The combined or integrated system, which may include one or more Integrated Confirmation and Laser sensors, may be referred to herein as "Missile Approach Confirmation Sensor (MACS) with Directed IR Counter Measure (DIRCM) or MACS-DIRCM unit".

In accordance with the present invention, the self-protection system may include a central computer or processor adapted to determine whether or not the incoming threat exists, based on sensor fusion algorithm able to fuse data received from the one or more electro-optic sensors and data received from the one or more MACS-DIRCM units. The central computer or processor may select or determine the appropriate countermeasure technique or countermeasure device to be activated in response to the incoming threat. The selected countermeasure technique or countermeasure device may be activated, for example, by one or more of the high power laser modules integrated within each of the one or more radar verification sensors. The selected countermeasure may be activated and deployed while the system continuously monitors response(s) and/or behavior of the incoming threat, for example, via electro-optic sensors and/or missile approach confirmation sensors. Furthermore, the central computer or processor may determine whether or not to deploy additional countermeasure techniques or devices, and whether or not to activate other infrared countermeasures (e.g., flares).

The present invention may optionally be utilized in conjunction with aircrafts equipped with self-protection systems which may be based on electro-optic and/or radar based warning sensors, or may be based on a combination of such sensors. For example, the present invention may optionally be utilized in conjunction with devices, systems, and methods which are described in U.S. patent application Ser. No. 12/659,350, titled "Device, System and Method of Protecting Aircrafts Against Incoming Threats", filed on Mar. 4, 2010, published on October 7, 2010 as United States Patent Application Publication Number 2010/0253567, which is hereby incorporated by reference in its entirety.

The present invention may optionally be utilized in conjunction with aircrafts equipped with self-protection systems which utilize an additional missile verification sensor for the purpose of verifying the incoming threat and/or for reduction of false alarms. For example, the present invention may optionally be utilized in conjunction with devices, systems, and methods which are described in the above-mentioned patent application.

The present invention may optionally be utilized in conjunction with aircrafts equipped with a self-protection system which includes various or multiple protection devices, for example, chaff and flare dispensing systems, omni-directional Infra-Red Countermeasure (IRCM) devices that do not require precise angular position information of the incoming threat for successful countermeasure, and/or standalone DIRCM devices that may utilize precise angular position information of the incoming threat for successful countermeasure against such incoming threat.

In self-protection systems equipped with a DIRCM unit, the source for the directional accuracy required may be provided from a primary electro-optic or radar detection sensor, and may be fine-tuned by an additional electro-optic sensor that is integral to the DIRCM unit itself. The present invention may provide techniques and systems able to overcome time constraints, accuracy requirements, false alarm issues and/or the need for an additional electro-optic sensor within the DIRCM for fine-tuning. Accordingly, the present invention may reduce the volume and/or the weight of such DIRCM unit(s).

The present invention demonstrates one or more MACS-DIRCM units implemented as a single Line Replaceable Unit (LRU) able to perform both verification and countermeasure functions.

The MACS-DIRCM unit may be a gimbaled slewed sensor. The verification functionality of the MACS-DIRCM unit may be based on Ka-Band Pulse-Doppler radar architecture; and/or may be based on directional high power laser transmitter architecture.

The system may include a laser generator to generate high power pulsed laser. The laser generator may be part of the MACS-DIRCM unit. The laser generator may have simultaneous interfaces to one or more of the MACS-DIRCM units.

Optionally, the verification functionality of the one or more MACS-DIRCM units may be performed prior to activation of the countermeasure functionality. Furthermore, the countermeasure functionality of the MACS-DIRCM unit may be initialized prior to completing the verification functionality, for example, in order to deploy initial and/or generic countermeasures in time-critical situations.

The self-protection system of the invention may optionally include generation of high power laser signal by an additional LRU which may be connected to the one or more MACS-DIRCM units, for example, by fiber optic interface, communication interface, power interface, and/or other suitable interfaces.

The MACS-DIRCM unit may be based on dual axis azimuth and elevation mechanic steering architecture, such that verification and countermeasure functionalities may be assembled on the same slewed dual-axis gimbal.

The angular mechanical movement of the MACS-DIRCM unit may be calculated according to the angular position of the incoming threat as provided by one or more electro-optic sensors.

The verification functionality of the MACS-DIRCM unit may be (e.g., as a default) in passive or standby mode, and may be activated only after receiving the incoming threat signal from the central computer or processor.

The verification functionality of the MACS-DIRCM unit may provide precise angular position of the incoming threat for effective or improved directional countermeasure functionality.

The verification functionality of the MACS-DIRCM unit may provide threat type data or family classification data, such as threat range, threat velocity, threat radar cross-section, threat rotation, and/or threat trajectory; and such data may be used for effective or improved directional countermeasure functionality Extraction of precise angular position of the incoming threat may be performed using the verification functionality of the MACS-DIRCM unit, for example, by utilizing dual axis sigma/delta calculation, amplitude comparison, phase comparison, and/or other suitable methods.

Data regarding the incoming threat (e.g., velocity, range, angular position, or the like) may optionally be transmitted from the aircraft carrying the self-protection system to another aircraft, using various suitable techniques.

The countermeasure functionality of the MACS-DIRCM unit may be (e.g., as a default) in passive or standby mode, and may be activated only after verification is performed successfully and the countermeasure activation command is received from the central computer or processor.

The countermeasure functionality of the MACS-DIRCM unit may be based on multispectral laser transmitted signal, for example, utilizing portions of the spectrum such as near infrared and mid-wave infrared. The spectrum occupancy of the signal transmitted by the MACS-DIRCM unit may be updated according to the results of the verification functionality of the MACS-DIRCM unit.

The central computer or processor may determine the required time for the verification process to be performed by the MACS-DIRCM unit. The central computer or processor may determine the required time for the countermeasure process to be performed by the MACS-DIRCM unit.

Optionally, a constructed countermeasure transmitted waveform may be based on parameters of the incoming threat, for example, initial range between the incoming threat and the aircraft, relative velocity between the incoming threat and the aircraft, threat radar cross-section, threat roll rate, threat identification, and/or threat electro-optic intensity. Other suitable parameters may be used. The constructed countermeasure waveform parameters may be updated during the countermeasure process, for example, based on updated threat parameters which may be provided by the verification functionality of the MACS-DIRCM unit. Additionally or alternatively, the constructed countermeasure waveform parameters may be updated during the countermeasure process, based on updated threat parameters and algorithms which may be processed by the central computer verification functionality.

Optionally, a radome may cover the MACS-DIRCM unit. The radome may be formed of material(s) that allow transmission of electromagnetic signals and/or laser signals; such materials may include, for example, transparent composite materials or multi-spectral transparent composite materials.

The self-protection system may utilize a high-power pulsed laser transmitter, which may be an integral part of an antenna structure used by the verification functionality of the MACS-DIRCM unit.

Optionally, handover of an incoming threat for verification purposes or for countermeasure activation purposes may be performed between or among multiple MACS-DIRCM unit units. The handover may be performed, for example, in order to achieve better field-of-view or for other operational reasons.

The present invention may include a unified or combined aircraft protection system which may include, for example, one or more Missile Approach Confirmation Sensors (MACS) with one or more integral High powered laser modules. The aircraft protection system may be used as an airborne self-protective system, together with or instead of one or more other airborne countermeasure devices (e.g., flare dispensers).

In accordance with the present invention, a missile warning system of an aircraft may include, for example: a wide-angle electro-optic sensor, that continuously monitors the airspace for incoming threats (e.g. airborne missiles), and a narrow-angle electromagnetic sensor (e.g., radar sensor), optionally operative in Ka Band. The radar sensor may be activated, for example, only when the electro-optic sensor detects a possible incoming threat. Upon its activation, the radar sensor may receive from a central computer or processor data indicating an approximate location or direction of the incoming threat, based on the electro-optic sensor data and aircraft navigation data received from an Inertial Measurement Unit (IMU). The radar sensor may then adjust its position towards the incoming threat, and may perform one or more confirmation cycles in order to verify the possible detection, to accurately pinpoint the threat direction, and/or to derive further threat classification parameters (e.g., threat range, threat velocity, threat Radar Cross Section (RCS), threat rotation rate, or other parameters). The central computer or processor may declare a valid incoming threat according to pre-defined data fusion and decision algorithms; and may command the MACS-DIRCM unit with regard to the optimal or preferred set of countermeasure technique(s) or device(s) that are to be activated towards the incoming threat. The MACS-DIRCM unit may already be accurately pointing toward the incoming threat and/or may already be tracking the incoming threat.

The MACS-DIRCM unit may activate or deploy the high powered laser that may be an integral part of the mechanical form of the MACS-DIRCM unit, for the maneuvering part of the MACS-DIRCM unit. For example, one or more high powered lasers may be pre-installed on an antenna of the MACS-DIRCM unit, to achieve high accuracy and/or coupling of the antenna and the countermeasure. Optionally, the MACS-DIRCM unit may include more than one high powered laser transmitter on the antenna or on other portions or areas of the mechanical form of the MACS-DIRCM unit.

The installation onboard the aircraft of the MACS-DIRCM unit may include a set or suite of sensors or units, or a set or suite of MACS-DIRCM units, thereby allowing for better or greater coverage of protection, and/or reducing or avoiding possible obstructions to the field(s)-of-view of multiple MACS-DIRCM units, for example, due to installation or mounting considerations and/or due to aircraft structure or shape.

The combined installation of the MACS-DIRCM unit may allow increased accuracy and time-on-target, and may allow decreasing of time to countermeasure activation, thereby improving the overall protection provided by the system to the aircraft.

Optionally, a method may be used for fine-tuning the threat direction by using RF capabilities of the verification functionality. The method may provide increased directional accuracy to the MACS-DIRCM unit. This may further reduce the required field-of-regard of the directional countermeasure function, and may allow a reduction in the power consumption, volume and/or weight of the aircraft protection system.

The particular countermeasure(s) deployed by the MACS-DIRCM unit may be selected to be optimal with regards to the incoming threat, based on classification algorithms performed by the verification function and the central computer or processor.

A radome structure may be used to protect the MACS-DIRCM unit. The radome may be constructed of one or more materials to allow multispectral transparency which may be required for transmission of both RF in the Ka Band and high powered laser in the IR and the SWIR ranges.

Reference is made to FIG. 1, which is a schematic diagram illustration of a MACS-DIRCM unit 100, which may be mounted on or connected to an aircraft, in accordance with the invention.

As shown in FIG. 1, a Radio Frequency (RF) module 101 may be connected to a High-Power Laser Module (HPLM) 102 (which may include one or more high-power laser transmitters), an antenna 103, and an elevation motor 104. The RF module may be used for various parts of the verification functionality of the MACS-DIRCM unit, for example, generation of transmit (Tx) waveform, frequency up-conversion, signal amplification, signal transmission to the antenna 103, receipt of signal form the incoming threat, frequency down-conversion, amplification, sampling, and/or other signal processing methods.

The HPLM 102 may be used for transmission of a high-power laser waveform. The transmitted high-power laser waveform may be constructed of one or more types of the signals, for example, pulse wave, linear frequency modulated signal, and/or constant wave in the IR spectral wavelengths.

The antenna 103 may be connected to the elevation motor 104 used for transmission and reception of the electromagnetic signal that may be used for verification of the incoming threat. The antenna 103 may include multiple sub-modules, for example, to allow the algorithms to gather the threat direction at a required accuracy level.

The elevation motor 104 may be used for moving the RF module 101, the HPLM 102 and/or the antenna 103 along an elevation axis. The definition of the elevation axis may be performed according to, for example, the aircraft elevation axis or other suitable vector or line. The elevation motor 104 may be connected to the azimuth motor 105.

The azimuth motor 105 may be used for moving the RF module 101, the HPLM 102, the elevation motor 104 and/or the antenna 103 along an azimuth axis. The definition of the azimuth axis may be performed according to, for example, the aircraft azimuth axis or other suitable vector or line. The azimuth motor 105 may be connected to a mechanical chassis 109.

The mechanical chassis 109 may be used for installation (e.g., internal installation) of a power supply 106 and/or a Digital Signal Processor (DSP) module 107. The mechanical chassis 109 may have external electrical connectors that may be used as connection to an interface 110 with an A/C and central computer.

The DSP module 107 may be used for various functionalities, for example, digital signal processing of the data generated by the verification functionality of the MACS-DIRCM unit 100, pre-triggering of the countermeasure functionality of the MACS-DIRCM unit 100, and/or controlling the elevation motor 104 and/or the azimuth motor 105.

A radome 111 may be used for protecting the RF Module 101, the elevation motor 104 and the azimuth motor 105 (or other gimbals or gimbaling units), the antenna 103, and/or the HPLM 102. The radome 111 may further allow transparent transmission of both RF energy and laser energy, as well as reception of RF energy. The radome 111 may have an aerodynamic shape, for reducing the aerodynamic effects of installation of the MACS-DIRCM unit 100 on a carrier aircraft.

Figure 2:
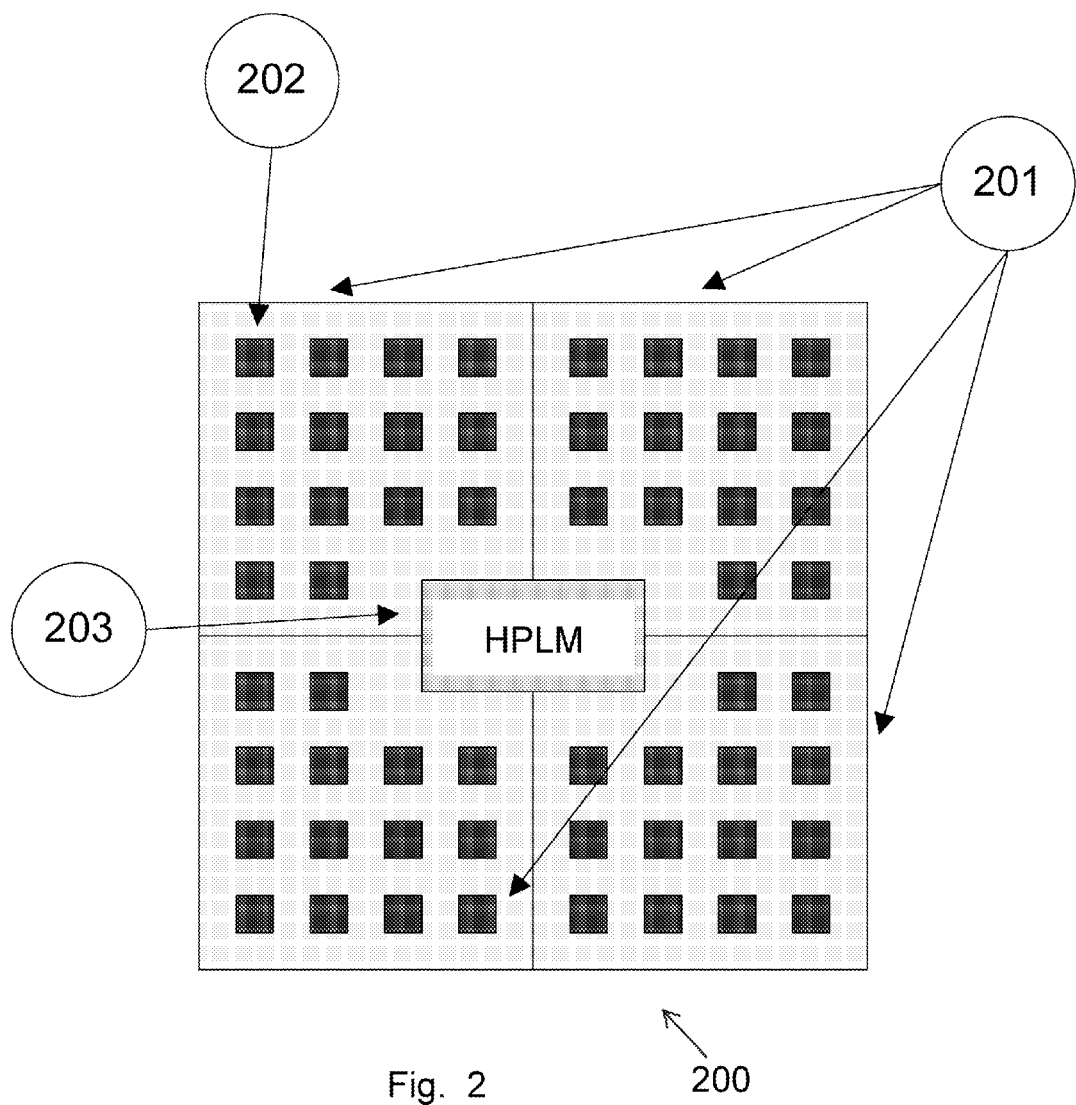
FIG. 2 is a schematic illustration of the antenna and integrated high power laser module architecture, in accordance with the present invention.

Reference is made to FIG. 2, which is a schematic illustration of antenna architecture 200 which may be part of the MACS-DIRCM unit, in accordance with the invention.

An antenna 201 may be designed as, for example, a patch antenna, a CoPlanar Waveguide (CPW) antenna, or other suitable antenna types.

The antenna 201 may be divided to four regions or quarters. The division of antenna 201 may be performed in order to implement techniques for precise angular position calculation of the incoming threat to be verified by the MACS-DIRCM unit. Such techniques may include, for example, Sigma/Delta, phase comparison, and/or other suitable techniques.

Each one of the quarters or regions of antenna 201 may be constructed of one or more radiating elements 202. The radiating elements 202 may be used for transmission and receiving of electromagnetic signal(s). The number of radiating elements 202 shown in FIG. 2 is for illustration only, and the invention is not limited to particularly 14 radiating elements 202 per each quarter; other suitable number(s) of radiating elements 202 may be used. The radiating elements 202 may be constructed using different techniques, for example, patches or slots in waveguide structure.

The radiating elements 202 may be connected with each other using various techniques, for example, power dividing network or waveguide based interconnections.

The antenna 201 may include, or may be coupled to, or may be associated with, a High-Power Laser Module 203 which may include one or more high-power laser transmitters.

Figure 3:
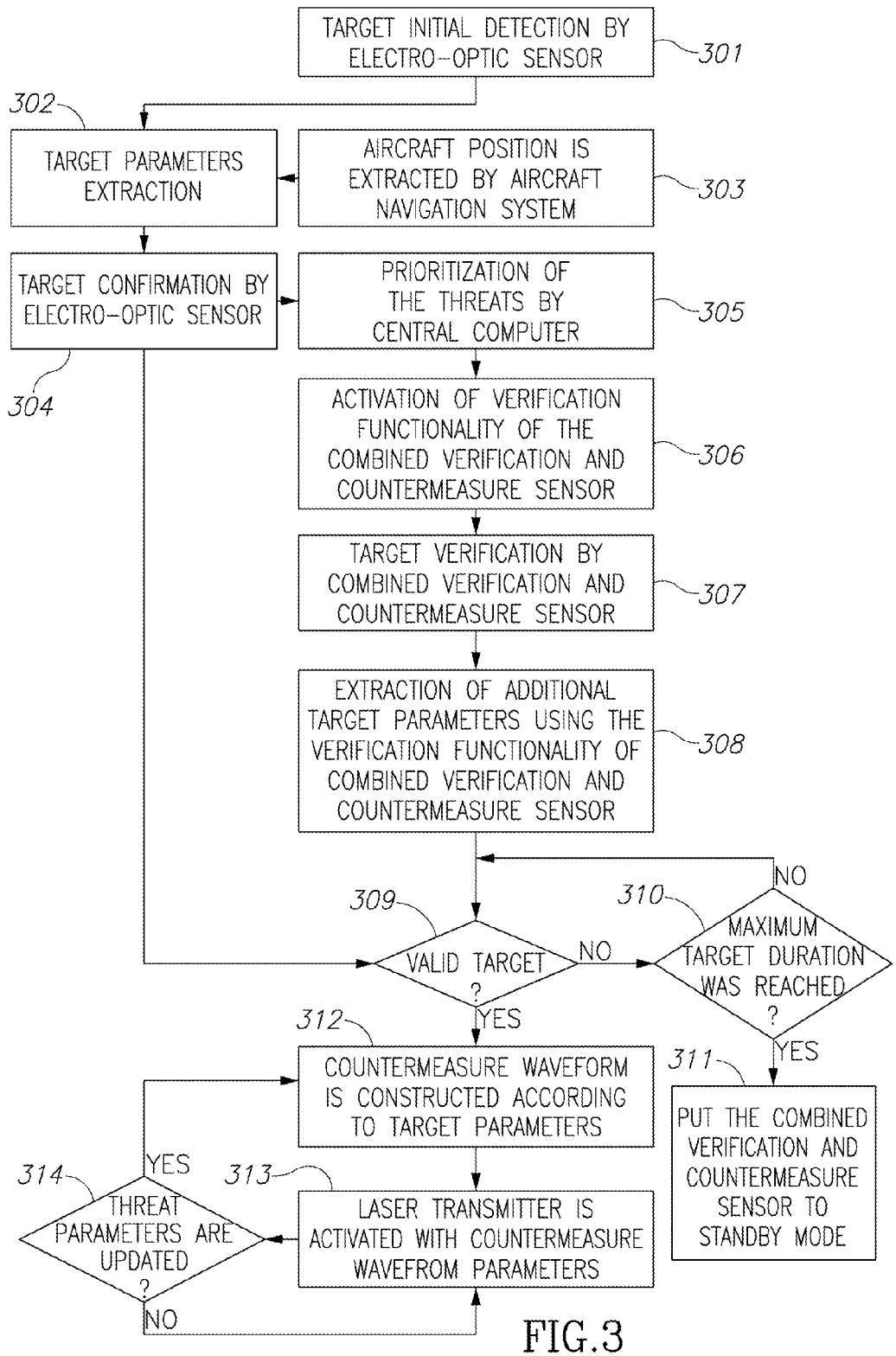
FIG. 3 is a flow-chart of a method of threat verification and countermeasure activation, in accordance with the present invention.

Reference is made to FIG. 3, which is a flow-chart of a verification and countermeasure method, in accordance with the invention.

Threat initial detection (301) may be performed by one or more of electro-optic sensors that may be installed onboard the aircraft.

After the threat initial detection is performed, extraction of threat parameters (302) may be performed. Such parameters may include, for example, azimuth and elevation angles, threat intensity in IR or UV electro-optic band, and threat rank or priority. Threat parameters extraction may optionally be based on receipt of the aircraft angular position (303) from the aircraft navigation system.

After extraction of threat parameters, confirmation of the threat (304) may be performed by one or more electro-optic sensors. The number of confirmed threats may be one, or more than one.

Prioritization of the threats (305) may be performed by a central computer or processor. The activation of verification (306) of the MACS-DIRCM unit may be performed according to the prioritization of the threats (305).

Activation of verification (306) using the MACS-DIRCM unit may be performed based on the extraction of threat parameters (302). The activation may include, for example, slewing the MACS-DIRCM unit to the direction of the incoming threat.

After activation of verification, threat verification (307) may be performed by the MACS-DIRCM unit, for example, by using radar-based verification functionality.

Extraction of additional threat parameters (308) may be performed by the verification functionality of the MACS-DIRCM unit. Such parameters may include, for example, threat velocity, threat range, threat type or family, and/or threat acceleration.

Validation of the threat (309) may be based on the confirmation of the threat by electro-optic sensor(s) (304) and extraction of additional threat parameters (308), using the MACS-DIRCM unit.

If the result of the validation of threat (309) is negative, then the validation may be repeated and/or performed, for example, until maximum threat duration (310) is reached.

If the maximum threat duration (310) is reached, and validation of threat (308) is negative, then the verification functionality of the MACS-DIRCM unit may be put or switched to a standby mode (311).

If the result of validation of threat (309) is positive, then the countermeasure waveform for the countermeasure functionality of the MACS-DIRCM unit may be constructed (312), according to the extracted threat parameters.

After construction of countermeasure waveform (312), the countermeasure functionality of the MACS-DIRCM unit may be activated (313) for deployment of threat countermeasure.

If threat parameters are updated (314) during the countermeasure functionality of the MACS-DIRCM unit, then the countermeasure waveform construction (312) may be updated accordingly.

Other suitable operations or sets of operations may be used.

Figure 4:
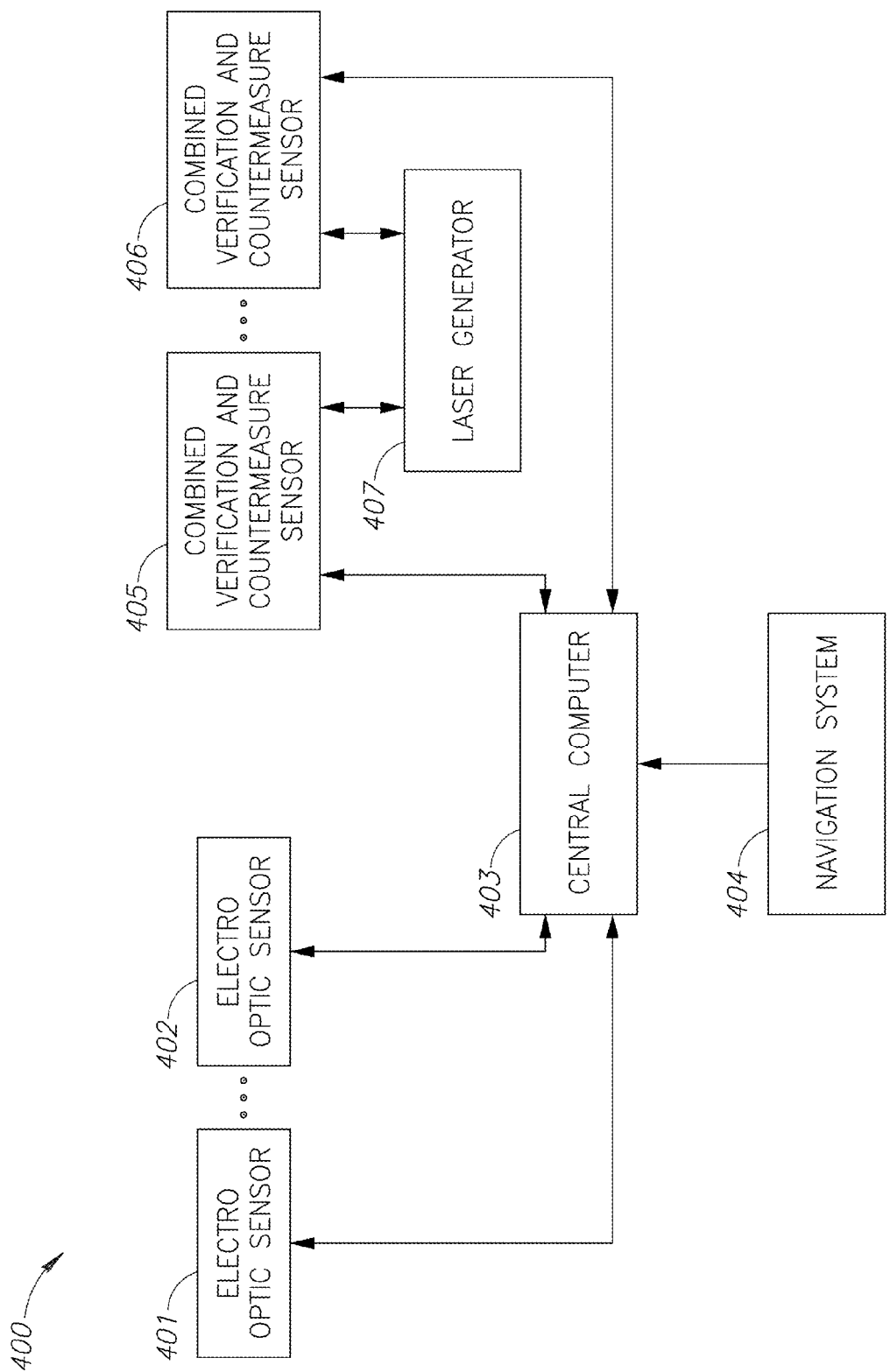
FIG. 4 is a schematic illustration of an airborne protection system, in accordance with the present invention.

Reference is made to FIG. 4, which is a schematic illustration of an airborne protection system 400 in accordance with the invention.

In system 400, electro-optic sensors 401 and 402 may be connected to a central computer 403 (or to a processor, controller, Integrated Circuit (IC), or other logic implemented by hardware and/or software components). The number of electro-optic sensors 401-402 is shown for demonstrative purposes only, and is not limited to two. The electro-optic sensors 401 and 402 may continuously sample and image the area around the aircraft, and may provide threat data to the central computer 403 using suitable signal processing method(s).

The operation of the electro-optic sensors 401 and 402 may be based on, for example, UV, IR, visible and/or SWIR wavelengths regions.

The central computer 403 may be connected to a navigation system 404 of the aircraft, in order to receive aircraft navigation data for calculation of threat parameters. The central computer 404 may optionally provide the navigation data which is received from the navigation system 404, to the electro-optic sensors 401 and 402.

MACS-DIRCM units 405 and 406 may be connected to the central computer 403. The number of MACS-DIRCM units is for demonstrative purposes only, and is not limited to two. The MACS-DIRCM units 405 and 406 may perform the verification and countermeasure functionalities as described above.

The verification functionality of the MACS-DIRCM units 405 and 406 may be based on radar sensing in frequency band, for example, Ka-Band.

The countermeasure functionality of the MACS-DIRCM units 405 and 406 may be based on transmission of energy on various electro-optic wavelength regions, for example, IR and SWIR.

The combined verification sensors 405 and 406 may be connected to one or more laser generators 407. The laser generators 407 may generate (e.g., simultaneously) the high-power laser signal for one or more of the MACS-DIRCM units 405 and 406 using one or more suitable techniques.

The terms "plurality" or "a plurality" as used herein include, for example, "multiple" or "two or more". For example, "a plurality of items" includes two or more items.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

Discussions herein utilizing terms such as, for example, "processing," "computing", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Some embodiments of the present invention may be implemented by software, by hardware, or by any combination of software and/or hardware as may be suitable for specific applications or in accordance with specific design requirements. Some embodiments may include units and/or sub-units and/or circuits, which may be separate of each other or combined together, in whole or in part, and may be implemented using specific, multi-purpose or general processors or controllers. Some embodiments may include buffers, registers, stacks, storage units and/or memory units, for temporary or long-term storage of data or in order to facilitate the operation of particular implementations.

Functions, operations, components and/or features described herein with reference to one or more embodiments, may be combined with, or may be utilized in combination with, one or more other functions, operations, components and/or features described herein with reference to one or more other embodiments, or vice versa.

While certain features of some embodiments have been illustrated and described herein, many modifications, substitutions, changes, and equivalents may occur to those skilled in the art. Accordingly, the claims are intended to cover all such modifications, substitutions, changes, and equivalents.

What is claimed is:

1. A system for protecting an aircraft against one or more incoming threats, the system comprising:
   one or more electro-optic sensors to scan an area around the aircraft for one or more possible incoming threats, and to generate an indication signal once an incoming threat is detected;
   an integrated unit combining a Missile Approach Confirmation Sensor (MACS) with Directed Infra-Red Counter Measure (DIRCM), to verify the incoming threat and to activate a countermeasure against the verified incoming threat, wherein the integrated MACS with DIRCM comprises: a threat parameter generator to generate threat parameters during verification of a threat, and to provide said threat parameters to a spectrum selector to select spectrum occupancy for a countermeasure unit; and
   a processor to receive data from said one or more electro-optic sensors and the integrated MACS-DIRCM unit, and to select a countermeasure technique for deployment against the incoming threat.

2. The system of claim 1, wherein the one or more electro-optic sensors substantially continuously sense the area around the aircraft for incoming threats.

3. The system of claim 1, wherein the MACS-DIRCM unit comprises a plurality of MACS-DIRCM units having a plurality of non-identical fields-of-view, respectively.

4. The system of claim 1, further comprising a dual-axis steering gimbal to slew said MACS-DIRCM unit to a direction of the incoming threat.

5. The system of claim 1, wherein said MACS-DIRCM unit comprises one or more pulse Doppler radar units.

6. The system of claim 1, wherein said MACS-DIRCM unit comprises a high-power laser transmitter.

7. The system of claim 6, wherein said high-power laser transmitter is part of an antenna structure of said MACS-DIRCM unit.

8. The system of claim 1, wherein a verification functionality and a countermeasure functionality of the MACS-DIRCM unit are mounted on a common gimbal.

9. The system of claim 1, wherein the MACS-DIRCM unit comprises:
   a threat parameter generator to generate threat parameters during verification of a threat, and to provide said threat parameters to a countermeasure generator for construction of a countermeasure waveform for the incoming threat.

10. The system of claim 9, wherein said countermeasure generator comprises means to update countermeasure parameters based on updated verification parameters.

11. The system of claim 10, wherein said countermeasure generator comprises a target locator to determine a target location during verification of the threat.

12. The system of claim 9, wherein said countermeasure generator is to be activated during activation of a verification functionality of said MACS-DIRCM unit.

13. The system of claim 9, wherein said countermeasure generator is to be activated after completion of a verification functionality of said MACS-DIRCM unit.

14. The system of claim 1, further comprising:
   a housing comprising a radome, wherein said radome allows transmission of electromagnetic signals and optic signals.

15. The system of claim 1, wherein said processor comprises:
   a data fusion unit to perform data fusion of data from the one or more electro-optic sensors and from the MACS-DIRCM unit.

16. The system of claim 1, wherein one or more MACS-DIRCM units are connected to one or more laser generators in parallel.

17. A system for protecting an aircraft against one or more incoming threats, the system comprising:
   one or more electro-optic sensors to scan an area around the aircraft for one or more possible incoming threats, and to generate an indication signal once an incoming threat is detected:
   an integrated unit combining a Missile Approach Confirmation Sensor (MACS) with Directed Infra-Red Counter Measure (DIRCM), to verify the incoming threat and to activate a countermeasure against the verified incoming threat,
   wherein the integrated unit combining said MACS with DIRCM is implemented as a single Line Replaceable Unit (LRU) able to perform both verification and countermeasure functions; and
   a processor to receive data from said one or more electro-optic sensors and the integrated MACS-DIRCM unit, and to select a countermeasure technique for deployment against the incoming threat.

18. The system of claim 17, wherein said integrated MACS-DIRCM unit comprises one or more pulse Doppler radar units.

19. The system of claim 17, wherein said integrated MACS-DIRCM unit comprises a high-power laser transmitter.

20. The system of claim 17, wherein a verification functionality and a countermeasure functionality of the integrated MACS-DIRCM unit are mounted on a common gimbal.

* * * * *